United States Patent
Kamath

(10) Patent No.: US 12,205,190 B2
(45) Date of Patent: Jan. 21, 2025

(54) MIMICKED MACHINE-READABLE CODES, AND METHODS

(71) Applicant: Digimarc Corporation, Beaverton, OR (US)

(72) Inventor: Ajith M. Kamath, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 378 days.

(21) Appl. No.: 17/516,464

(22) Filed: Nov. 1, 2021

(65) Prior Publication Data

US 2022/0138892 A1 May 5, 2022

Related U.S. Application Data

(60) Provisional application No. 63/200,873, filed on Mar. 31, 2021, provisional application No. 63/107,990, filed on Oct. 30, 2020.

(51) Int. Cl.
*G06K 9/00* (2022.01)
*G06T 1/00* (2006.01)
(Continued)

(52) U.S. Cl.
CPC .......... *G06T 1/0028* (2013.01); *G06T 1/0064* (2013.01); *G06T 11/40* (2013.01); *G06T 11/60* (2013.01)

(58) Field of Classification Search
CPC ............... G06K 7/1404; G06K 7/1408; G06K 7/1413; G06K 7/1417; G06K 7/1421;
(Continued)

(56) References Cited

U.S. PATENT DOCUMENTS

| 5,649,032 A | 7/1997 | Burt |
| 6,122,403 A | 9/2000 | Rhoads |

(Continued)

FOREIGN PATENT DOCUMENTS

| WO | WO-2020019957 A1 * | 1/2020 | ........... G06T 1/0021 |
| WO | 2020198660 | 10/2020 | |

OTHER PUBLICATIONS

Kamath, "Signal Rich Art: Improvements and Extensions", Electronic Imaging, Media Watermarking, Security, and Forensics 2020, pp. 23-1-23-12.
(Continued)

*Primary Examiner* — Atiba O Fitzpatrick
(74) *Attorney, Agent, or Firm* — Digimarc Corporation

(57) ABSTRACT

In one aspect, a 2D machine readable code is mimicked by a collection of graphic elements. This can involve choosing a location, within an input 2D code block, at which correlation between a first graphic element and the input 2D code block is maximized. An area around this location is then disqualified from further consideration. A second location is next chosen, within the input 2D code block but outside the disqualified area, at which correlation between a second graphic element and the input 2D code block is maximized. The process continues in this fashion, adding graphics and removing additional areas from consideration, until a threshold number of graphic elements has been placed. The elements are then assembled in their corresponding locations to yield a composite image block that provides features mimicking that of the input 2D code block, thereby enabling the composite image block to be decoded by a compliant code reader. A great variety of other signal rich art arrangements are also detailed.

24 Claims, 15 Drawing Sheets

(51) Int. Cl.
*G06T 11/40* (2006.01)
*G06T 11/60* (2006.01)

(58) Field of Classification Search
CPC .... G06K 7/1426; G06K 7/143; G06K 7/1434; G06K 7/1439; G06K 7/1443; G06K 7/1447; G06K 7/1452; G06K 7/1456; G06T 2201/005; G06T 2201/0051; G06T 2201/0061; G06T 1/0021; G06T 1/0028; G06T 1/0035; G06T 1/0071; G06T 11/20; G06T 11/203; G06T 11/206; G06T 11/40; G06T 11/60; G06T 11/001; H04N 1/3232; H04N 1/32325
See application file for complete search history.

(56) References Cited

U.S. PATENT DOCUMENTS

| | | | |
|---|---|---|---|
| 6,137,498 A | 10/2000 | Silvers | |
| 6,449,377 B1 | 9/2002 | Rhoads | |
| 6,590,996 B1 | 7/2003 | Reed | |
| 6,614,914 B1 | 9/2003 | Rhoads | |
| 6,641,053 B1* | 11/2003 | Breidenbach | G06T 1/0071 235/494 |
| 6,975,744 B2 | 12/2005 | Sharma | |
| 6,993,152 B2 | 1/2006 | Patterson | |
| 7,286,685 B2 | 10/2007 | Brunk | |
| 9,747,656 B2 | 8/2017 | Stach | |
| 9,819,950 B2 | 11/2017 | Boles | |
| 9,959,587 B2 | 5/2018 | Sharma | |
| 10,217,182 B1 | 2/2019 | Holub | |
| 10,242,434 B1 | 3/2019 | Holub | |
| 10,506,128 B1 | 12/2019 | Chadwick | |
| 10,628,647 B1* | 4/2020 | Rossier | G06T 1/005 |
| 11,037,038 B2 | 6/2021 | Kamath | |
| 11,514,285 B2 | 11/2022 | Kamath | |
| 12,073,487 B2* | 8/2024 | Kamath | G06T 1/0028 |
| 2002/0136429 A1 | 9/2002 | Stach | |
| 2003/0053654 A1 | 3/2003 | Patterson | |
| 2004/0032972 A1 | 2/2004 | Stach | |
| 2005/0207615 A1 | 9/2005 | Stach | |
| 2006/0097062 A1* | 5/2006 | Cheong | G06K 7/1408 235/494 |
| 2008/0112590 A1 | 5/2008 | Stach | |
| 2009/0220121 A1 | 9/2009 | Stach | |
| 2011/0214044 A1 | 9/2011 | Davis | |
| 2015/0324946 A1* | 11/2015 | Arce | G06K 19/06103 382/251 |
| 2015/0339838 A1* | 11/2015 | Friedman | G06K 7/1495 345/641 |
| 2016/0267493 A1* | 9/2016 | Liu | G06K 19/06037 |
| 2016/0364623 A1 | 12/2016 | Evans | |
| 2017/0024840 A1 | 1/2017 | Holub | |
| 2017/0214820 A1 | 7/2017 | Davis | |
| 2019/0139176 A1* | 5/2019 | Stach | G06T 1/005 |
| 2019/0213705 A1* | 7/2019 | Kamath | G06N 3/045 |
| 2019/0266749 A1 | 8/2019 | Rhoads | |
| 2019/0306385 A1 | 10/2019 | Sharma | |
| 2019/0332840 A1 | 10/2019 | Sharma | |
| 2019/0378235 A1 | 12/2019 | Kamath | |
| 2020/0311505 A1 | 10/2020 | Kamath | |
| 2020/0320660 A1 | 10/2020 | Kamath | |
| 2020/0396055 A1* | 12/2020 | Zhao | H04W 12/63 |
| 2021/0004930 A1* | 1/2021 | Kamath | G06T 1/0028 |
| 2021/0387399 A1 | 12/2021 | Filler | |
| 2021/0390358 A1 | 12/2021 | Filler | |

OTHER PUBLICATIONS

Hunt, Photo Tiled Pictures, 2004.
International Preliminary Report on Patentability and Written Opinion for App. No. PCT/US2020/025420, dated Sep. 28, 2021, 11 pages.
International Search Report and Written Opinion for App. No. PCT/US2020/025420, dated Sep. 7, 2020, 19 pages.
Kamath, Hiding in Plain Sight: Enabling the Vision of Signal Rich Art, IS&T Int'l Symposium on Electronic Imaging, Jan. 2019.
Kamath, Signal Rich Art: Improvements and Applications, presentation at Electronic Imaging Conference, Jan. 27, 2020.
Kamath. Signal Rich Art: Object Placement, Object Position Modulation and Other Advances, IS&T Int'l Symposium on Electronic Imaging, Jan. 18, 2021.
Photographic Mosaic, Wikipedia article, Jan. 10, 2019.

* cited by examiner

MIMICKED MACHINE-READABLE CODES, AND METHODS

RELATED APPLICATION DATA

This application claims priority to provisional applications 63/200,873, filed Mar. 31, 2021, and 63/107,990, filed Oct. 30, 2020. Those applications are incorporated herein by reference.

TECHNICAL FIELD

In one aspect, the present technology concern mimicking 2D machine-readable codes in alternative, typically more aesthetically-pleasing, manners (sometimes termed "signal rich art").

INTRODUCTION

Our patent document 20080112590 teaches that a grey scale digital watermark signal can be thresholded to identify peaks, which serve as relevant points in a placement map. Discrete message elements, such as marbles or Dalmatian spots, can be placed at these relevant points in the placement map to form a representation of the watermark signal. Our patent documents 20030053654, 20040032972, 20050207615 and 20090220121 have related teachings about representations of digital watermark signals by discrete elements, such as by patterns of tulips planted in a field, or stones placed on a barren area of ground.

Our patent document 20190378235 teaches various methods for expressing a digital watermark signal as a sparse pattern of marks. It further explains how such a sparse pattern of marks can be converted into other forms, e.g., line meshes that also express the watermark pattern.

Our patent document 20190139176 teaches an object position modulation technique in which graphical objects, originally positioned in a regular array, can be moved to new positions to be consistent with signal gradients of a watermark signal at the objects' locations.

Our patent document 20200320660 teaches how neural network techniques can be employed to modify artwork to include digital watermark signals.

Our patent document 20200311505 teaches that a digital watermark pattern can be imitated in a photo-mosaic fashion, using tiled excerpts chosen from unrelated imagery. In such arrangement, the watermark pattern is divided into a regular array of edge-adjoining sub-blocks. For each sub-block, a search is conducted to identify an unrelated image excerpt that has a high correlation with the sub-block. Such image excerpts are then tiled edge to edge to yield a composite mosaic that mimics the edge-adjoining sub-blocks of the digital watermark pattern.

In one aspect, the present technology is akin to the just-noted photo-mosaic arrangement. However, rather than starting with sub-blocks of the watermark pattern, and then finding image excerpts that correlate, this aspect of the present technology starts with given image graphics, and then finds locations in the watermark pattern block with which they respectively most strongly correlate. A block including many of these input graphic patterns can thereby be composed, which collectively has attributes mimicking attributes of the original watermark pattern block.

In an illustrative example, the input graphics may be the capital letters "A," "B" and "C," in a particular font and size. The end result is an image block through which dozens of these letters are placed—often in a seemingly random way, to collectively form a representation of a watermark pattern.

The "independent" variables in this process may be said to be the input watermark pattern, and the user-selected set (dictionary) of input graphics. On these two variables the placements of the graphics depend. That is, the placements are the "dependent" variables that need to be found based on these two input factors. In contrast, in patent document 20200311505, the independent variables are the input watermark pattern and the placements (i.e., the edge-to-edge tiled sub-block positions). It is the image excerpts that then need to be found, based on these two input factors.

Aspects of the present technology enable a variety of new artistic expressions of 2D code signals.

The foregoing and other aspects of the present technology are detailed in the following detailed description, which proceeds with reference to the accompanying drawings.

DETAILED DESCRIPTION

Digital watermarking typically involves imparting a persistent identity to a digital object such as an image or audio. An alternative way of identifying objects is through fingerprinting. However, fingerprinting cannot distinguish between very closely related objects, such as edited or filtered media and may not be as robust in identification under noise, JPEG compression, cropping, and other modifications.

Typically, digital watermarks are implemented by adding an additional signal to a digital media object. However, the additional signal must be added at a low level of human perceptibility, so that the appearance of the original object is not altered.

In patent documents 20170214820 and 20200311505 we presented an alternative paradigm for digital watermarking called signal rich art, in which a visible artistic pattern carrying a digital payload is embedded into an image. Signal rich art can be used in several applications, such as advertising pamphlets, product packaging, container marking, document security, webpage and phone app backgrounds, etc., wherever artistic patterns are added by designers to enhance the appearance of an item. In patent document 20190378235 we presented techniques to create a broad palette of artistic signal carrying patterns.

Figure 1:
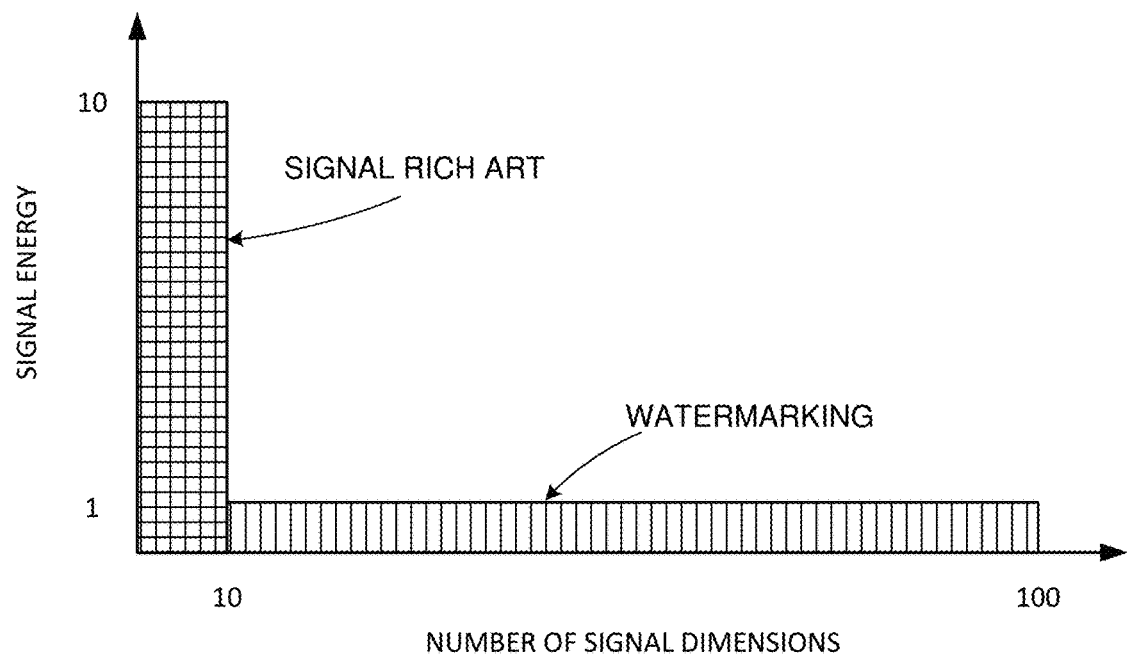
FIG. 1 expresses a relationship between number of a signal dimensions, and signal energy, for digital watermarking and signal rich art.

An idea underlying signal rich art is the tradeoff between signal dimensions and signal energy, as shown in FIG. 1. Since signal rich art patterns are not constrained by signal visibility, we can concentrate the signal energy in a few dimensions at a higher amplitude relative to a watermark signal.

Below we present new signal rich art algorithms, which can generate patterns that are different in appearance and variety from the previous techniques. We call one such technique Object Placement. We also describe some improvements to previously published techniques.

The techniques described below are of widespread applicability and can be applied to any 2D signal. Preferred embodiments apply such techniques with two-dimensional information carrying signals, such as 2D barcodes and digital watermark patterns.

Construction of digital watermark patterns is described, e.g., in patent document 20190332840 and in the other patent documents referenced herein. The present technology is illustrated with reference to the Digimarc digital watermark signal that is used to mark consumer packaging to improve retail efficiencies (inventory management, faster checkout, supplier ID etc.). The reader can test the signal carried by the patterns using the free Digimarc Discover App available in both the Apple and Android app stores.

Object Placement

Figure 2A:
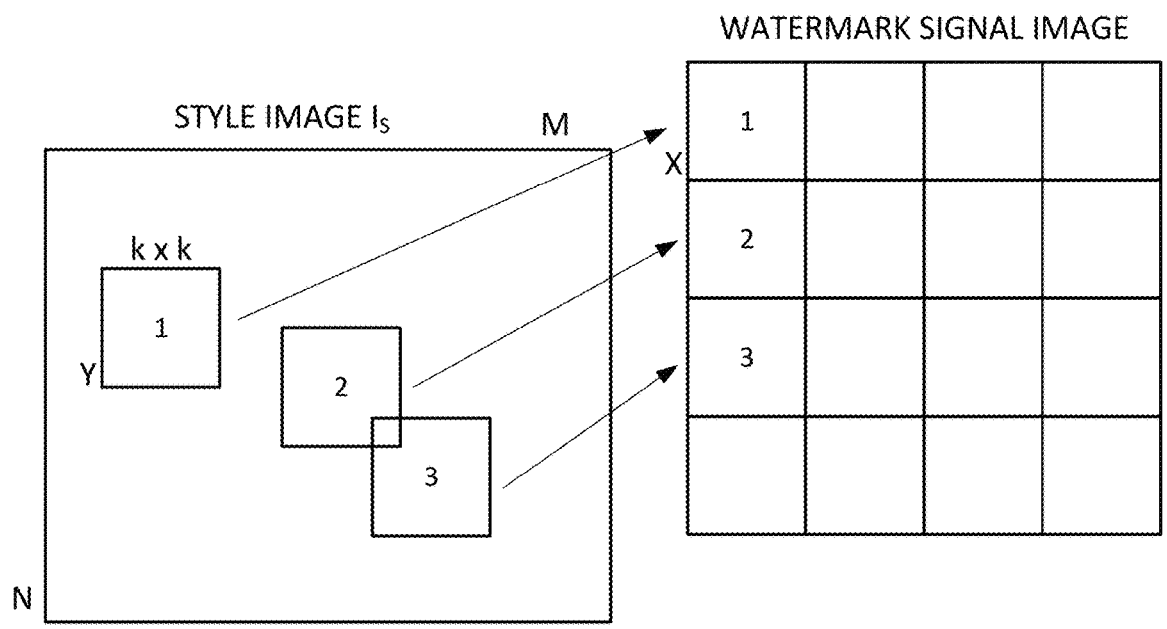
FIGS. 2A and 2B illustrate a prior art signal rich art method, in which a watermark signal is mimicked by edge-to-edge tiling of excerpts from a style image.
Figure 2B:
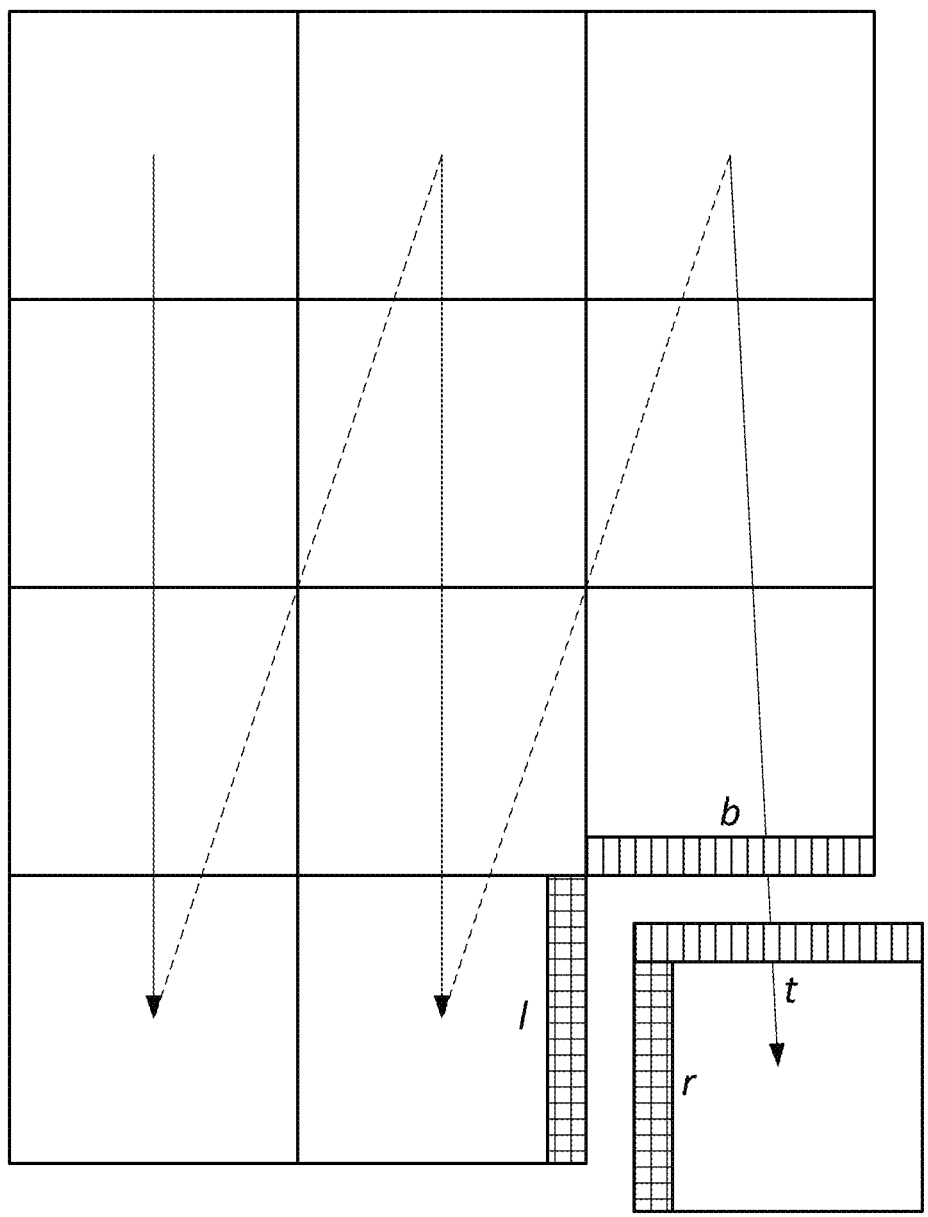

In patent document 20200311505, we described a signal rich art algorithm based on correlation of signal subblocks with a style image. As FIGS. 2A and 2B show, we place blocks from an unrelated style image in a sequential manner to generate a counterpart image that mimics features of a digital watermark pattern. We impose edge constraints to reduce the visual impact of edge discontinuities. However, it is not possible to completely overcome these artifacts where blocks adjoin.

The present Object Placement algorithm overcomes the block edge constraints by using a collection, or dictionary, of graphic objects (e.g., small shapes), and placing these objects to convey a specific payload (ID).

Figure 3:
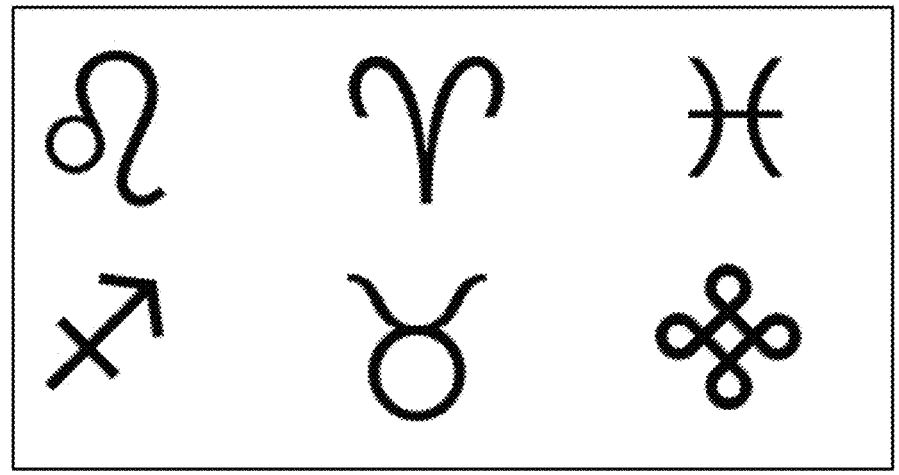
FIG. 3 shows a dictionary of graphic objects.
Figure 4:
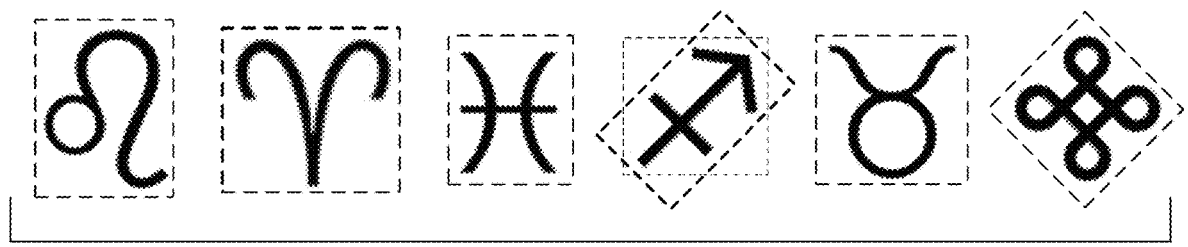
FIG. 4 show the objects of FIG. 3 in segmented form
Figure 4A:
FIG. 4A shows an alternative segmentation of one of the graphic objects.

FIG. 3 shows a collection of graphic objects that may be used. While the examples illustrated are binary (bitonal) objects, the technique is equally applicable to greyscale and color objects. If provided in a single data structure (e.g., an image), the individual objects can be segmented out by known segmentation techniques, as shown in FIG. 4. (Segmentation needn't use rectangular bounding boxes; other shapes can be used, e.g., as shown in FIG. 4A.)

Figure 5:
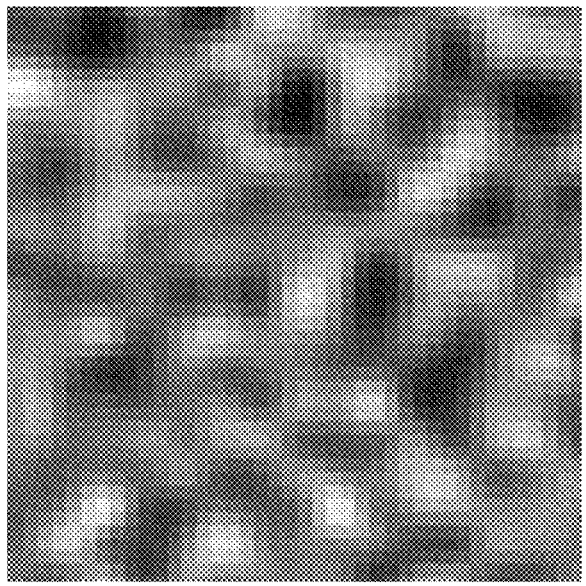
FIG. 5 shows an excerpt of a digital watermark pattern (in contrast-exaggerated form).

FIG. 5 shows an excerpt of a digital watermark signal pattern to be mimicked. This signal is a "continuous tone" watermark signal, but other types of watermark signals can be used as well.

The Object Placement algorithm receives this watermark signal, and a graphic object to be placed. A spatial correlation operation is then performed, finding the location within the watermark signal that presents the highest correlation with the graphic object. In the case of the graphic object shown at the right-most side of FIG. 4, the maximum correlation occurs when the object is placed as shown in FIG. 5. A record of such placement, and an identifier of the graphic object, may be stored in a data structure.

Figure 7:
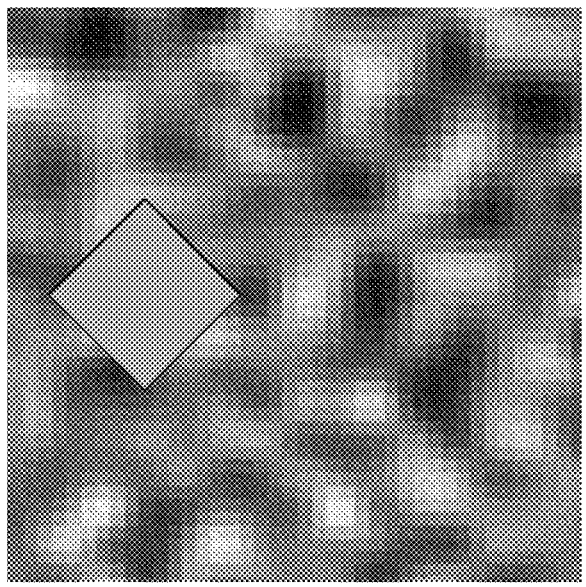
FIG. 7 shows how an area of a watermark pattern associated with the placed graphic object can be disqualified from further consideration.
Figure 8:
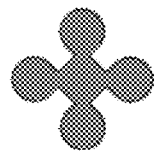
FIG. 8 shows an alternative shape for the disqualified area in FIG. 7.

Once a region of the digital watermark signal has been "matched" in this fashion with a graphic object, an area at the matching location is disqualified from further consideration. This is shown in FIG. 7 by the grey square. The disqualified area can be the size of the object's segmentation outline shown in FIG. 4, or it can be larger or smaller—depending on the density of objects ultimately desired in the counterpart image block. In some embodiments the disqualified area is defined by the outer contour of the object, e.g., as shown in FIG. 8. (Disqualification can be effected simply by changing corresponding locations in the watermark signal to a mid-grey value, since this will effectively prevent any other graphic object from having its maximum correlation at that location.)

This process repeats. A second object—identical to the first object, or a different object selected from the graphical object dictionary—is chosen as the object to be placed. A spatial correlation operation is again performed, finding the location within the watermark signal (now with a portion disqualified) that presents the highest correlation with this second object. Again, a record of such placement is stored, with an identifier of the object. A second area of the watermark signal, associated with placement of this second object at a second location, is then disqualified.

This process continues for many cycles. After a desired number of graphic objects has been placed, a counterpart signal block is constructed, by positioning the graphic objects at their respectively-determined placements.

The number of cycles used is application-specific. In some embodiments a fixed number of objects is placed. In other embodiments the process continues until a watermark strength metric derived from the counterpart signal block exceeds a desired threshold. (Suitable watermark strength metrics are detailed, e.g., in U.S. Pat. Nos. 7,286,685, 10,217,182 and 10,506,128.)

Generally speaking, the greater the number of objects, the more faithfully the watermark signal features are mimicked. However, visual appearance may not be as aesthetically pleasing if the resulting counterpart block is crowded with objects. If the disqualification areas are smaller than the graphic objects with which they are associated, then objects may be placed with some overlap—which may or may not be desired.

In subsequent cycles the objects can be changed, e.g., by rotation and/or scale, to obtain a more diverse set of patterns. This can help in improving the signal correlation.

Figure 6:
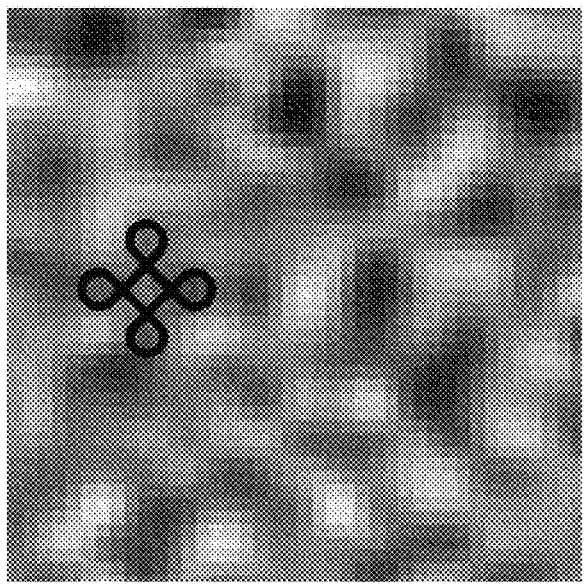
FIG. 6 shows placement of a graphic object from FIG. 4 that results in maximum correlation with the watermark pattern of FIG. 5.
Figure 9:
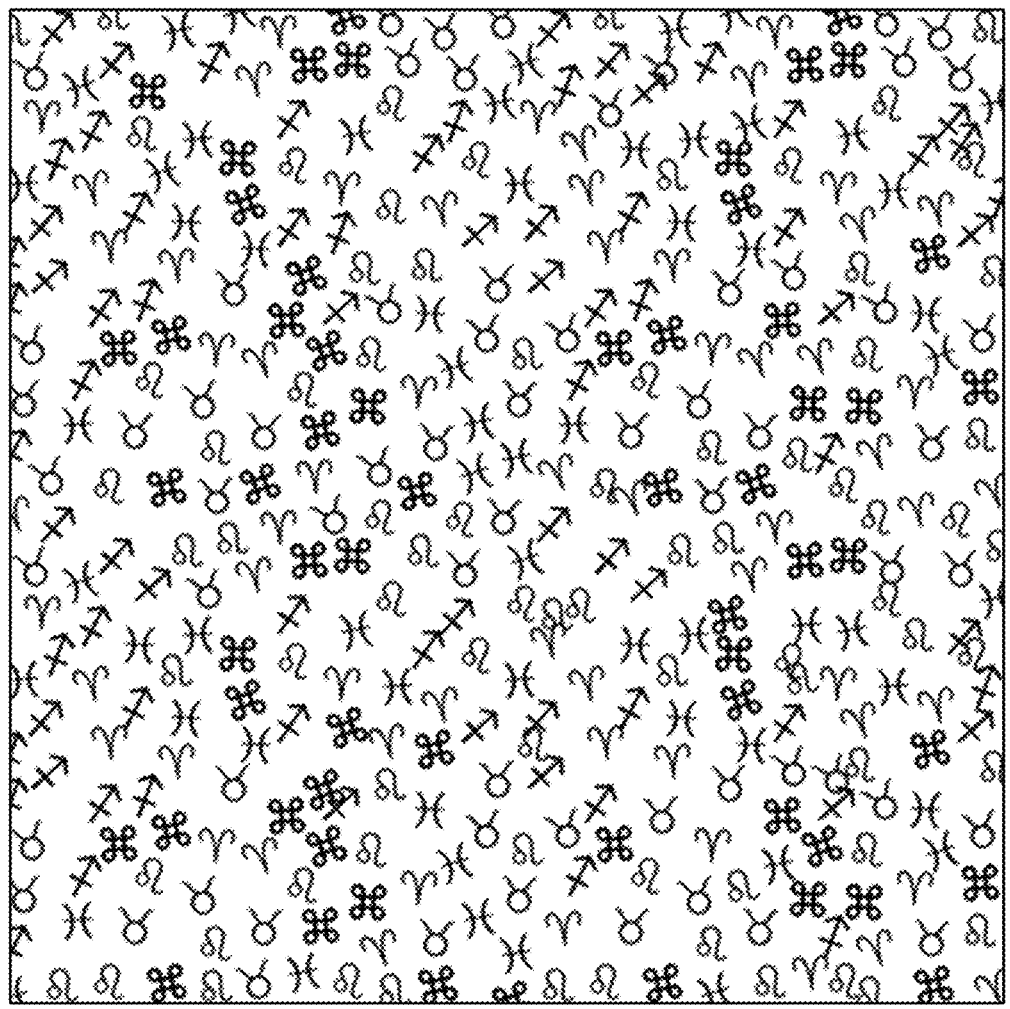
FIG. 9 shows a counterpart image block assembled from graphic objects in FIG. 4, mimicking a digital watermark signal block.

FIG. 9 shows a counterpart signal block produced by the just-described algorithm. Here a small random rotation is applied to each object for use in the following iterations. (This figure shows a complete signal block, unlike the small excerpt shown in FIGS. 5-7.

Figure 10A:
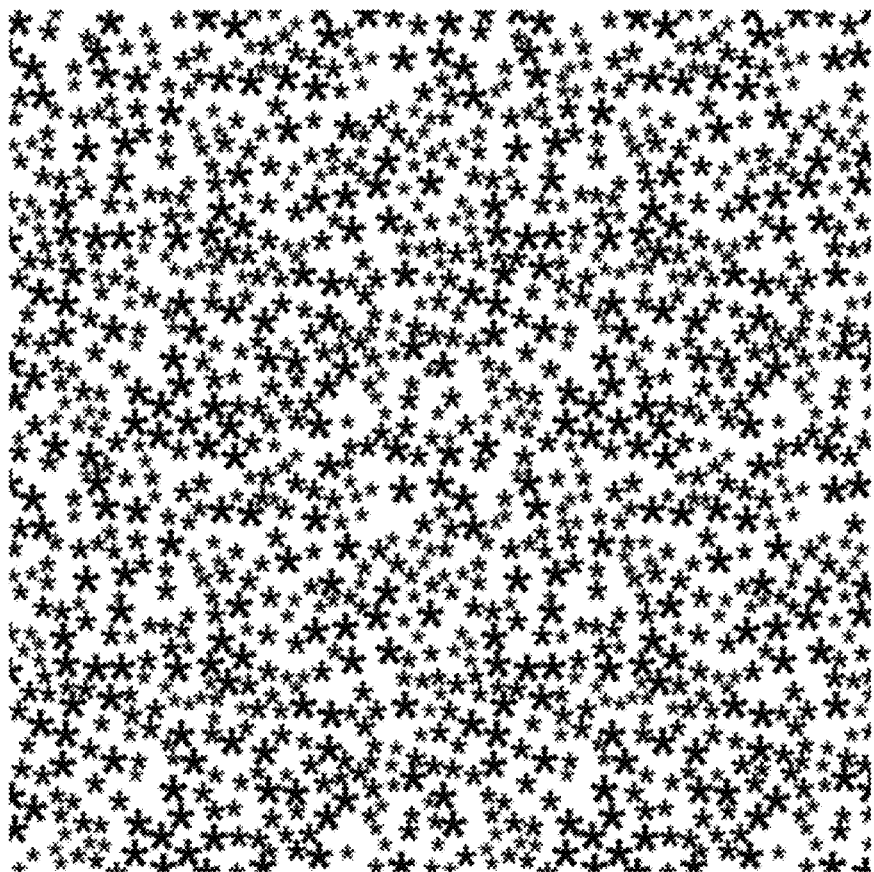
FIG. 10A is similar to FIG. 9, but assembled from a single graphic object, at different scales.
Figure 10B:
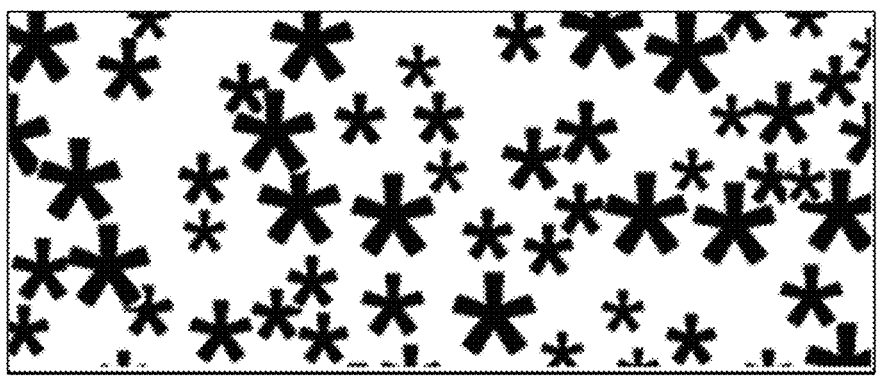
FIG. 10B is an enlarged detail from FIG. 10A.

FIG. 10A shows results of using the Object Placement method with just a single graphic, an asterisk. In this example, the scale of the asterisk is cycled between four different sizes in successive iterations of the algorithm loop. FIG. 10B shows an enlargement from FIG. 10A.

In some embodiments, different zones or regions of the watermark pattern are mimicked using different dictionaries of graphic objects. FIGS. 11A-D and 12 illustrate.

Figure 11A:
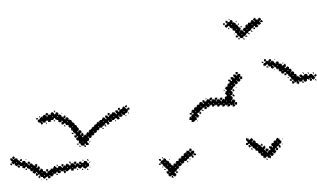
FIGS. 11A-11D show different dictionaries of graphic objects.
Figure 11B:
Figure 11C:
Figure 11D:
Figure 12:
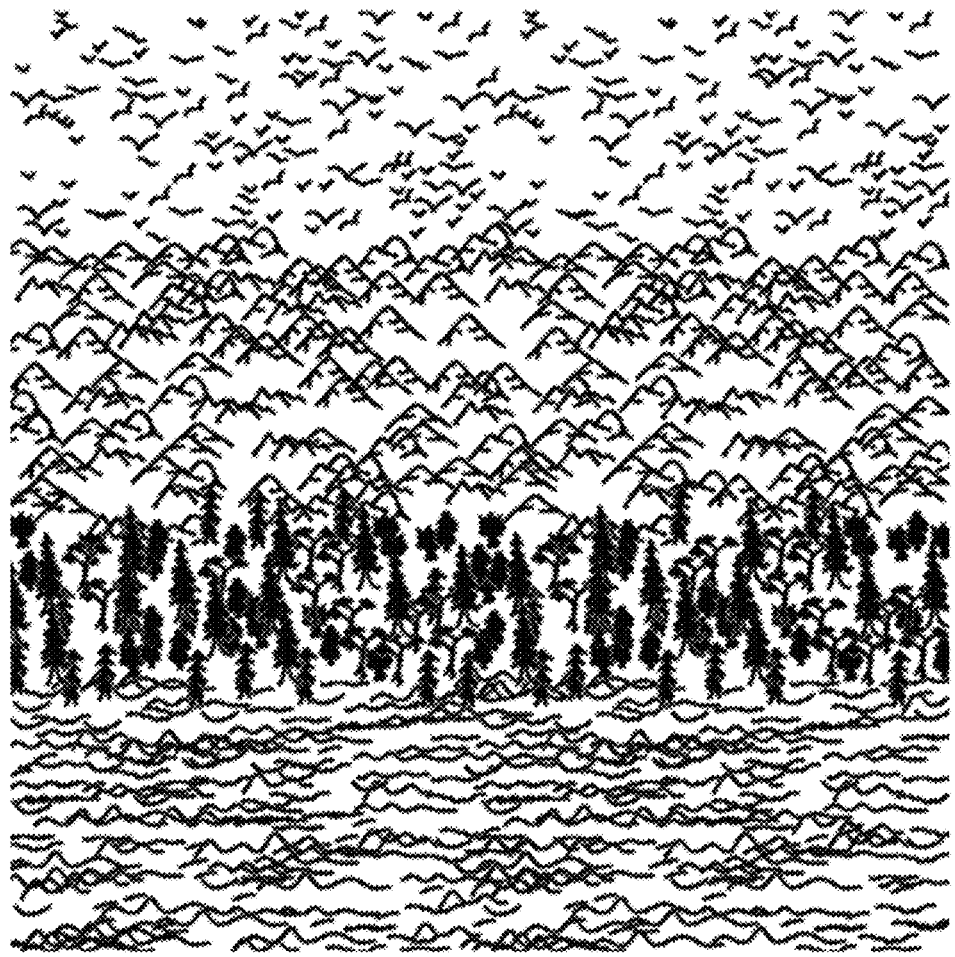
FIG. 12 shows how a watermark pattern block can be divided into different zones, and each zone mimicked with graphic elements drawn from a different of the FIGS. 11A-D dictionaries.

FIG. 11A shows a dictionary of objects for a first zone in the watermark pattern. FIGS. 11B-D show dictionaries of objects for second through fourth zones. The watermark pattern, in this example, is divided into four generally horizontal bands. The top band is populated with elements selected from the dictionary of FIG. 11A. The band below is populated with elements selected from the dictionary of FIG. 11B. And so on.

In this example, the borders between the zones are wavy lines (not shown) to give a more pleasing aesthetic (e.g., in which a horizontal line across the counterpart block sometimes intersects graphic objects from two different dictionaries).

In general, we can use zones with arbitrary boundaries and use "palettes" of signal carrying patterns to create artwork, much like the shaders used in computer generated imagery.

Figure 13:
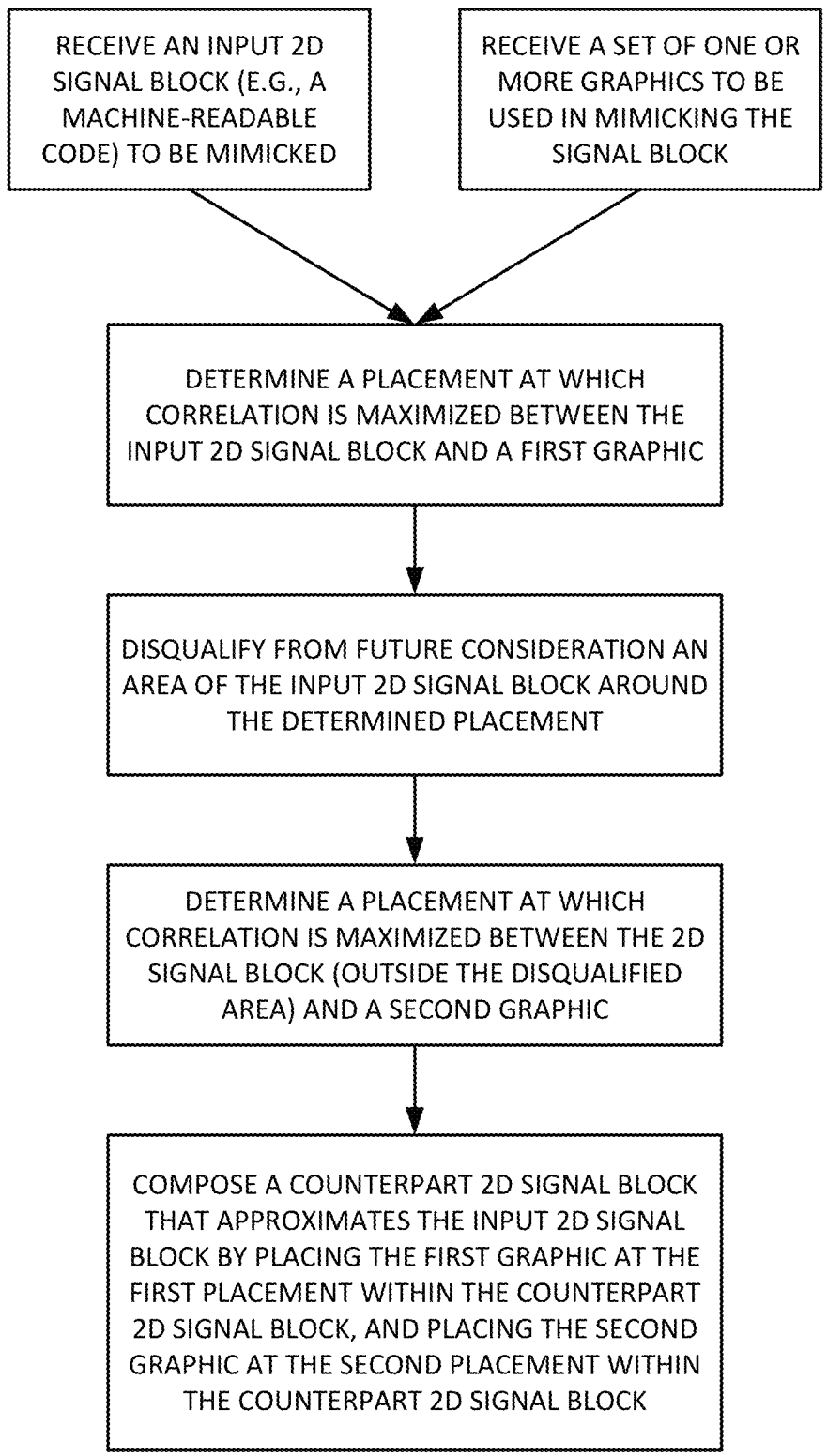
FIGS. 13 and 14 are flowcharts of object placement algorithms.
Figure 14:
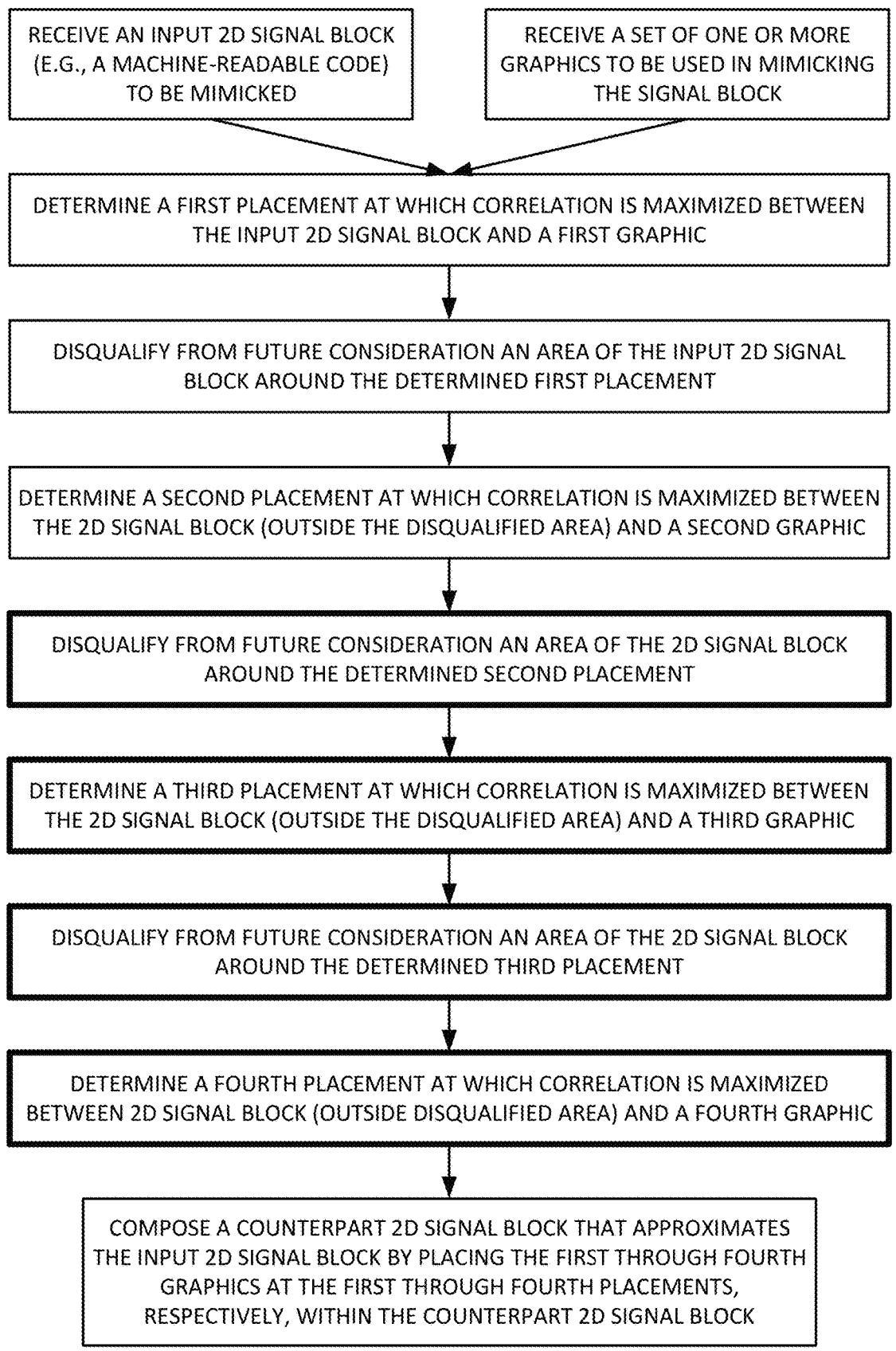

FIG. 13 provides a flowchart for a simple, exemplary implementation of the object placement algorithm—involving placement of just two objects. FIG. 14 shows an expansion of the FIG. 13 flowchart to place four objects (the additional steps are shown in bolder boxes).

Object Position Modulation

We next describe an alternative technique called Object Position Modulation to embed patterned artwork specified in a vector file format. In this case we are given a pattern with multiple small shapes (we call these small shapes objects or elements) and we locally alter the positions of the objects—we call this modulation—to correlate with a signal carrying a particular ID.

Figure 15:
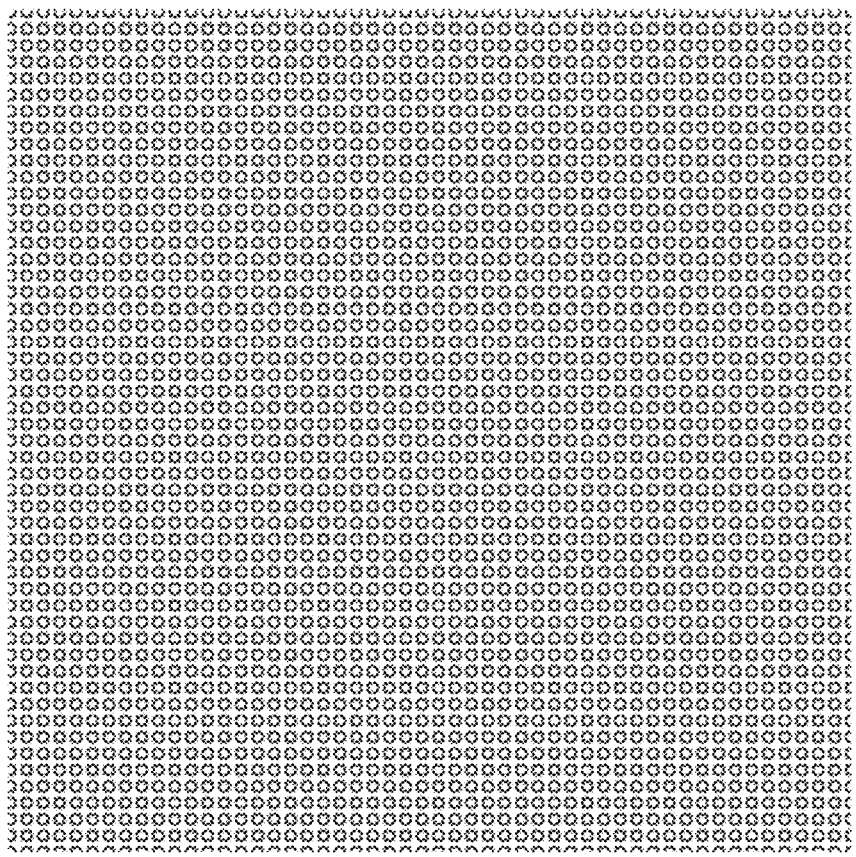
FIG. 15 shows a block comprising a multitude of small objects in a uniform array.

In some applications, we may have less freedom in the placement of the objects in the pattern, i.e., the pattern may be more strongly constrained. For instance, a user may want to embed a signal in a uniform pattern of circles as shown in FIG. 15. We also assume that the pattern is available in a vector file format and that we can manipulate the objects individually.

If the pattern of objects is sufficiently dense (we discuss what is sufficient below), and if we are permitted to perturb the positions of the objects slightly, we may still be able to embed an ID carrying signal in the pattern using the following approach.

To aid the discussion, we call each signal carrying pixel a "waxel," short for watermarking pixel element. This terminology is needed to discuss the watermarking signal scale when we are talking about arbitrary image DPI resolutions. For instance, consider a watermark signal that is embedded at a scale of 150 waxels per inch (WPI), which is the standard for the Digimarc Barcode signal used in consumer packaging applications. If we want to embed the signal in a pattern at a 600 DPI resolution, each waxel will now span 4×4 pixels, using the following math: 4 pixels per waxel=(600 DPI)/(150 WPI).

The signal we want to embed looks like a grayscale noise signal at the default 150 WPI resolution (e.g., akin to that shown in FIG. 5). However, at the target embedding resolution of 600 DPI, we may use nearest neighbor upsampling and apply a "small" Gaussian filter (e.g., 11 taps, with a standard deviation of 3) to smooth the waxel edge transitions. This has a minimal impact on the strength and readability of the signal, since it mostly filters out of band signal components. We may then compute a local gradient on this signal at the location of each waxel. A result of such computation, in the form of a gradient quiver plot, is shown in FIG. 16 for an excerpt of a watermark block.

Using the gradient computed at the 'center' of each object in a given pattern, we 'push' each object in the direction of the minima (darker areas of the signal), thereby achieving the desired correlation with the signal. Hence, we call this embedding algorithm as object placement modulation. We may dial up or down the amount we push each object based on the gradient magnitude, which allows us to control the signal embedding strength. However, the more we move each object, the larger the visual difference on the pattern.

Figure 16:
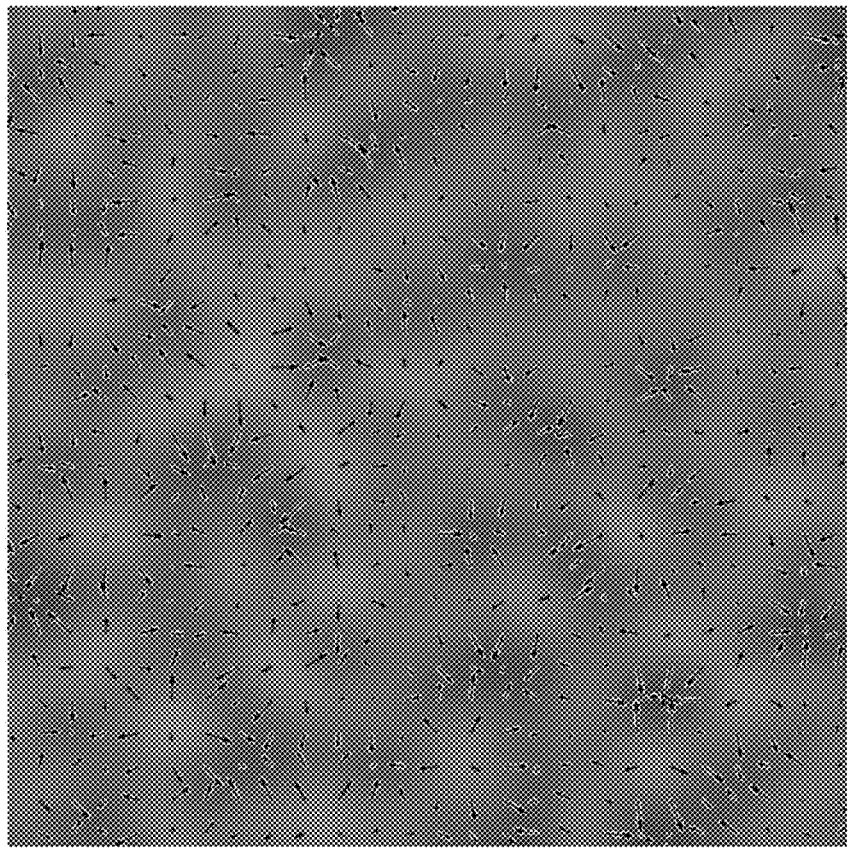
FIG. 16 shows an excerpt of a digital watermark pattern, overlaid with markings indicating directions and magnitudes of local signal gradients.
Figure 17:
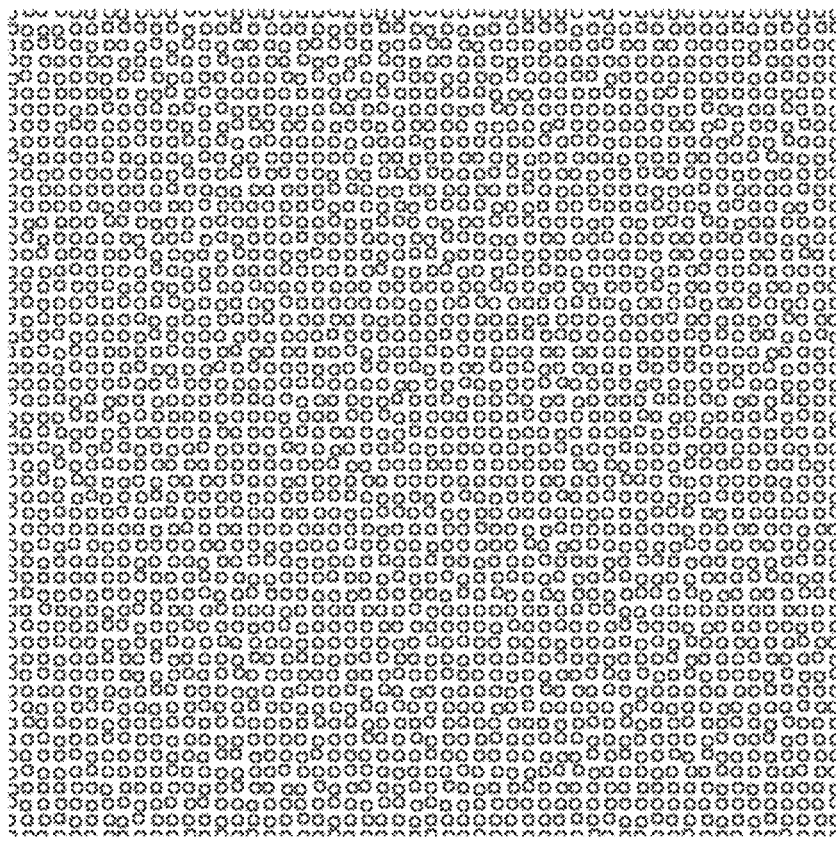
FIG. 17 shows the FIG. 15 block after processing by object position modulation, to mimic a digital watermark signal.
Figure 18:
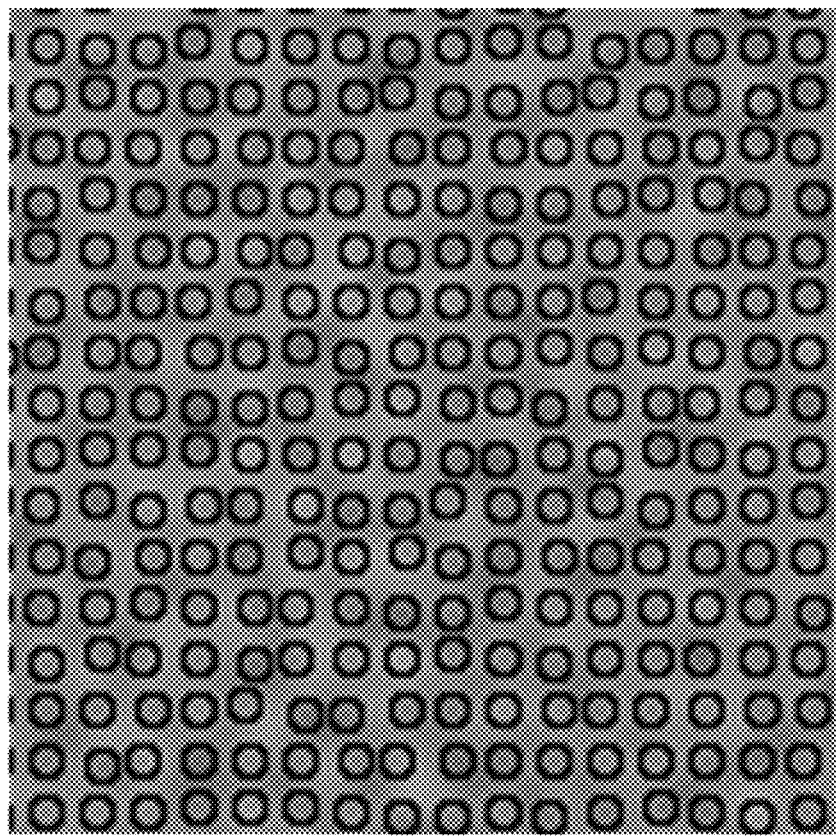
FIG. 18 is an enlarged detail from the FIG. 17 signal block, overlaid on a corresponding excerpt of the digital watermark signal being mimicked.

By pushing the small circles in FIG. 15, in accordance with the gradients shown in FIG. 16, the embedded pattern of FIG. 17 results. FIG. 18 shows the FIG. 17 pattern overlaid on the input watermark signal pattern excerpt, illustrating the clustering of circles near the dark areas of the pattern, and gaps in the lighter signal areas.

If the input pattern consists of a single object placed in a regular grid structure, as in FIG. 15, the impact of the modulation will be obvious. However, if the input pattern consists of irregularly placed objects, the modulation may be hard to perceive, thereby allowing us to embed a signal more strongly.

Strong embedding of the watermark signal by object position modulation can result in the input objects being pushed into overlapping positions. This requires vector graphic implementation, so that we can modulate the positions of the individual objects.

Figure 19:
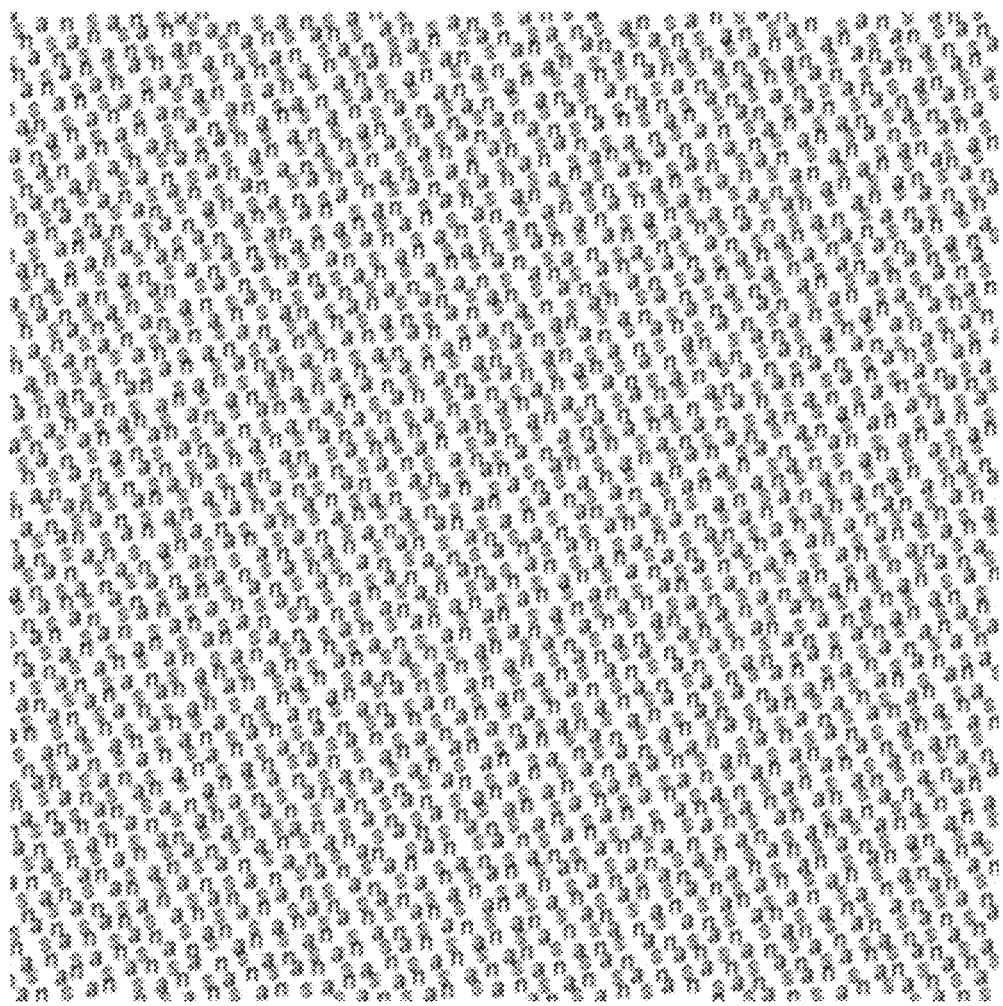
FIG. 19 shows another array of objects processed by object position modulation to mimic a digital watermark signal.

FIG. 19 shows an exemplary excerpt from an irregularly-spaced pattern of objects (letters "a," "n" and "s"), which has been modulated to mimic features of a watermark signal. Note how some of the letters overlap.

The object position modulation embedding method requires patterns with a sufficient density of objects, as mentioned earlier. An embedding resolution of 150 WPI yields $150^2$=22500 waxels per square inch. To achieve a reasonably good signal embedding strength, we need a pattern with an object density of at least 10% of that (i.e., not less than 2500 objects per square inch). For example, in the circle pattern, the density of the circles is about 14% of the waxel density (i.e., 3150 objects per square inch). This density threshold limits the application of the object position modulation algorithm to patterns of very small objects. In contrast, the object placement algorithm described in the previous section can embed a signal using objects that are an order of magnitude larger in size.

In a variant embodiment, we modulate the size of each object to increase or decrease the local grayscale contrast. For example, given the circle pattern of FIG. 15, we can increase the circle radius in areas where the signal is darker and decrease the radius where the signal is lighter. Again, this is more suitable when the given pattern is in a vector file format.

In a further variant, we locally warp the image, i.e., stretching or shrinking the image locally in a continuous manner in accordance with the spatially-corresponding gradient map to increase the pattern correlation with the signal to be mimicked. This approach is more suited to implementation in raster-formatted images, rather than vector-formatted images.

Hybrid Halftone Patterns

We described halftone signal rich art pattern generation using Voronoi and Delaunay graphs in patent document 20200311505 and in the paper Kamath, "Signal Rich Art: Improvements and Extensions", Electronic Imaging, Media Watermarking, Security, and Forensics 2020, pp. 23-1-23-12(12) (which was attached as an appendix to application 62/972,522, filed Feb. 10, 2020). The Voronoi pattern is based on a sparse mark created from local signal maxima, whereas the Delauanay pattern is created from local signal minima. The Delaunay pattern is comprised of triangles; the Voronoi pattern is comprised of polygons/hexagons.

Figure 20:
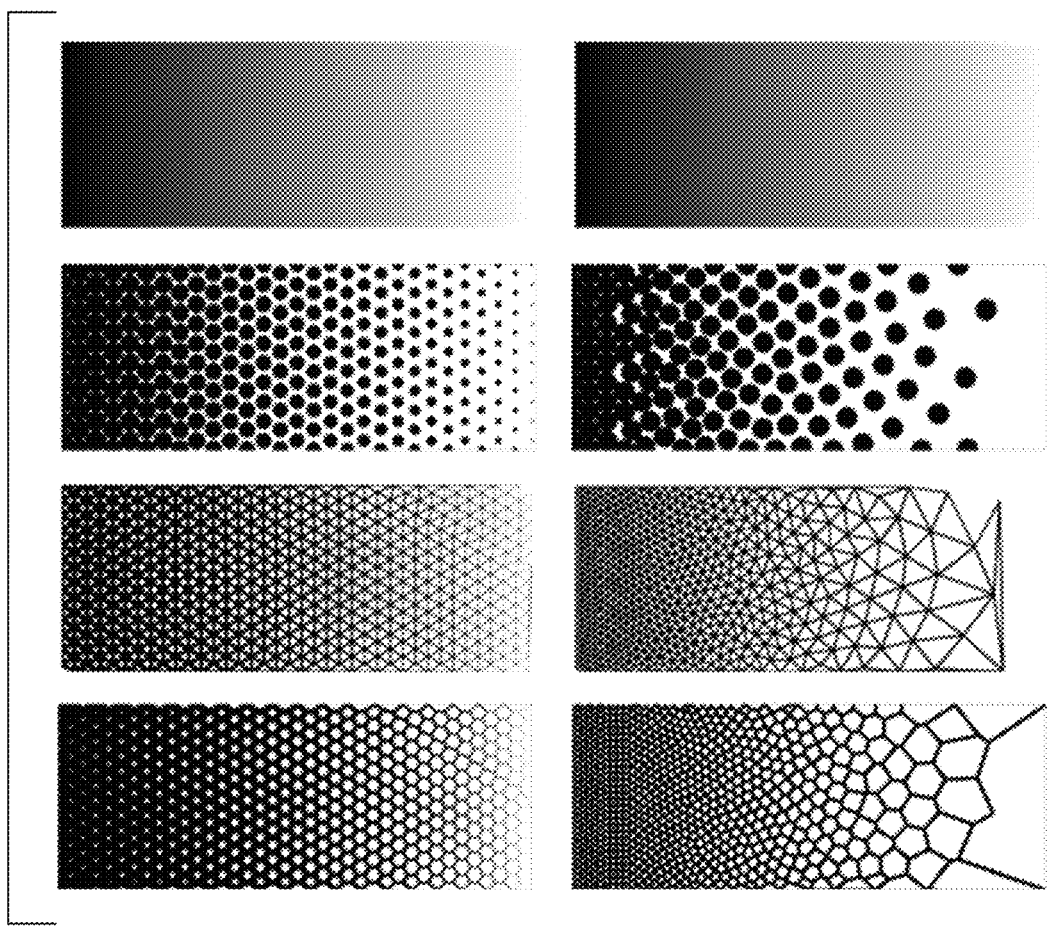
FIG. 20 illustrates different halftone arrangements for representing greyscales in imagery.

FIG. 20 shows grayscale ramps on the top row, and two classes of halftone patterns below. On the second row, the pattern on the left is based on dots of a fixed spatial density (defined by the centers of the dots) and variable dot radii to achieve a grayscale variation. This style is also called amplitude modulation (AM) in the print industry. The pattern on the right is based on dots of fixed radii but variable density to achieve greyscale variation. This style is called frequency modulation (FM) in the print industry.

On the third row are line counterparts to greyscale ramps. On the left is a pattern in which the line-outlined cells (triangles) are of uniform area but the line widths are varied to achieve greyscale variation (thereby providing amplitude modulation). On the right is a pattern in which the line widths are constant, but the cells are varied in area to achieve greyscale variation (thereby providing frequency modulation).

On the bottom row are related line-based patterns, but with the areas defined by polygons/hexagons.

To create halftone imagery conveying a digital watermark payload, we can digitally watermark the imagery, and then convert the greyscale values in accordance with a line-based halftone ramp, e.g., achieving amplitude modulation by varying the line thicknesses, or achieving frequency modulation by varying the cell areas.

However, it helps to separate the watermark signal embedding from the halftone image representation in order to achieve greater image fidelity. (At darker grayscale levels, the Voronoi and Delaunay cells converge to a uniform plane tiling, which does not provide the variability needed to embed a signal.)

Figure 21:
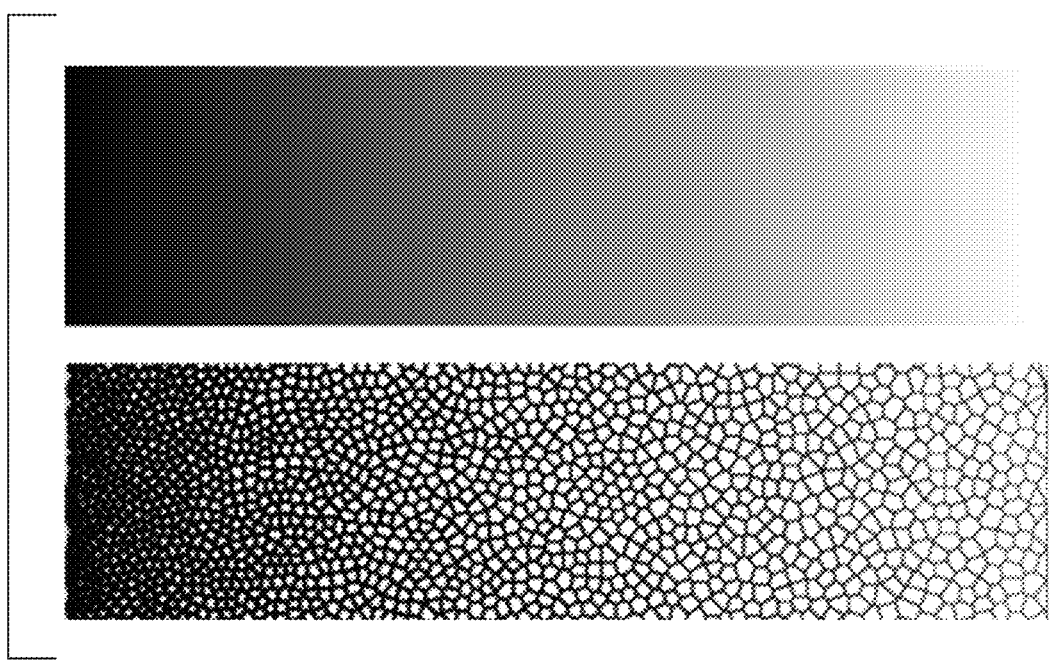
FIG. 21 illustrates a new halftone arrangement for representing greyscales in imagery.
Figure 22:
FIG. 22 shows the Lena image.
Figure 23:
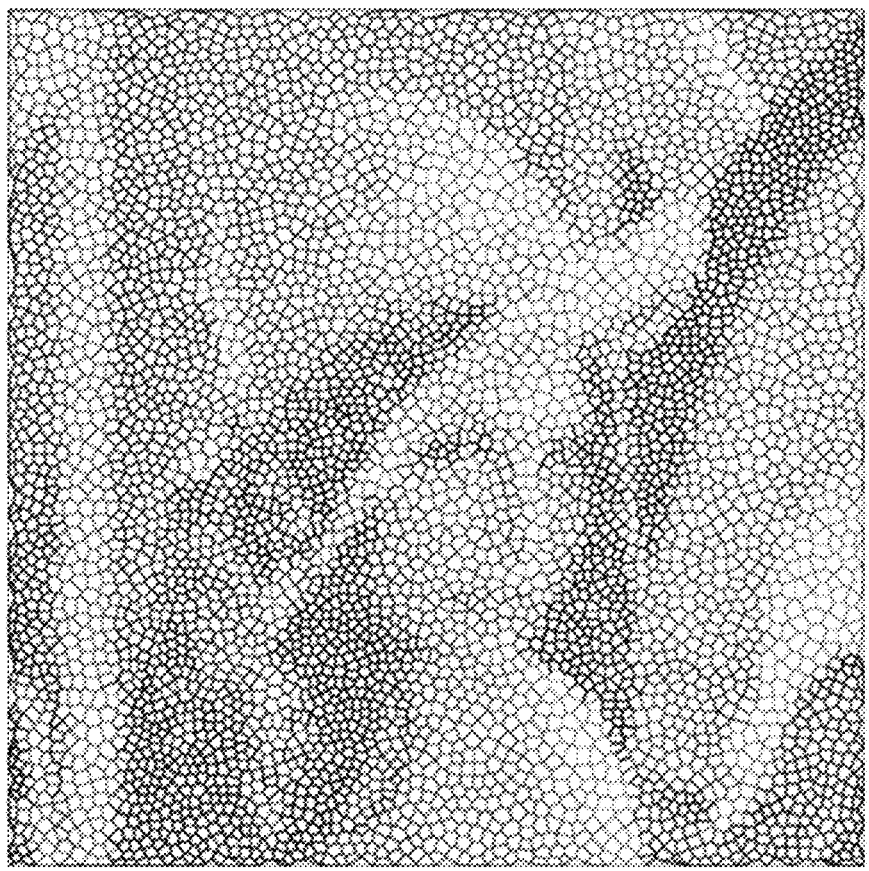
FIG. 23 shows its rendering using the halftone arrangement of FIG. 21.

FIG. 21 shows a hybrid Voronoi signal pattern in which a grayscale image controls the cell size and line thickness only, but with the locations of the cell centers being determined purely by locations of the watermark signal maxima. That is, the watermark maxima establishes where the areas are to be located; the image establishes how large the areas are to be, by varying the line thicknesses. FIG. 22 shows the familiar Lena image, and FIG. 23 shows this image rendered using the just-detailed technique.

The same approach can be used to create a Delaunay pattern by using the watermark signal minima instead of the maxima. In an alternative hybrid approach, the watermark signal can be used to modulate the line widths also, while the image only controls the cell size.

CONCLUDING REMARKS

Having described and illustrated principles of the technology with reference to a variety of illustrative examples, it will be recognized that the technology is not so limited.

For example, while it may be assumed that the detailed techniques are intended for printed artwork, the artwork can be rendered in other forms—such as by shaping the microtopology of a 3D surface, e.g., using molding (e.g., as detailed in pending patent application Ser. No. 17/347,358, filed Jun. 14, 2021) or laser shaping (e.g., as detailed in pending application Ser. No. 17/339,711, filed Jun. 4, 2021). Items marked in such fashion can be machine recognized, e.g., to aid sorting for recycling.

Except as noted, the detailed techniques are suitable for vector graphic implementation. For more on vector techniques, see our patent document 20210004930 and references cited therein.

Our previous work about representing digital watermark signals by discrete elements or marks, cited in the Introduction, involved placing objects at signal minima, to mimic binary signals. It will be recognized that embodiments of the detailed object placement algorithm, in contrast, are not so restricted in the form or placement of objects, and can thereby better mimic greyscale signals.

It will also be recognized that certain embodiments of our earlier work on correlation-based signal rich art operated by dividing the original code signal into tiled rectangular blocks, and sought to assemble a collage or mosaic of tiled corresponding rectangular blocks excerpted from style artwork to mimic the code. Embodiments of the present technology, in contrast, are not so restricted to such a tiled mosaic of rectangular blocks, but enable use of objects of any shape and size (including objects of different size and shape within a single signal collage). Objects can be overlaid by arbitrary amounts, or not at all. Typically, the more objects that are assembled into a signal-mimicking collage, the more faithfully does the collage mimic the original code signal. This gives the designer flexibility as to the degree of sparseness or busyness of the resulting artwork.

Figure 24:
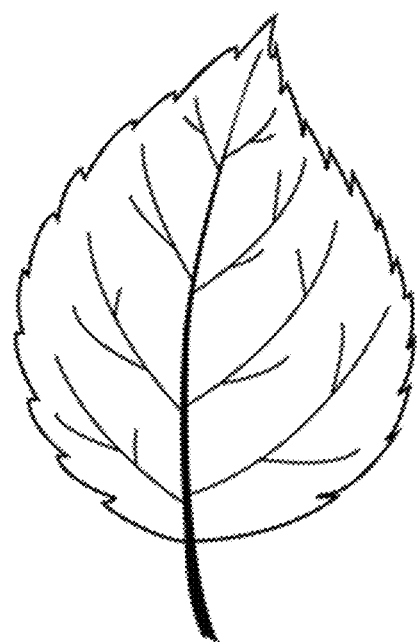
FIG. 24 shows a line art image of a leaf, which can be used in object placement embodiments of the present technology.

In a particular embodiment of the object placement technique, a single object, such as the line art leaf shown in FIG. 24, can be rotated to ten different rotations, and can be scaled to 3 different sizes, yielding a set of 30 different objects from which the method can select and place in a collage. The flexibility of the present technique, however, is believed to reside not so much in this number of different objects, but rather in the fact that they can be placed at any location within the signal tile to be mimicked.

If such an object is provided in raster (e.g., pixel) form, it can be varied in rotation and scale. If, however, the object is provided in vector form, with line elements defined by splines, then further freedom is available. For example, in the just-referenced leaf example, the component lines can be moved a touch in any direction, or can locally be made thinner or thicker, to further increase local correlation between the object and the signal tile being mimicked. (Additional information about line width modulation and related techniques is found in our U.S. Pat. No. 6,449,377, as well as in references cited earlier.)

Referring back to the mosaic method detailed in our publication 20200311505, applicant has found that the issue of edge discontinuities, where borders of component sub-blocks adjoin, is of diminished importance, or may be disregarded entirely, if a mosaic having edge discontinuities is created in raster form and then vectorized. Popular vectorization tools, such as the ImageTrace tool in Adobe Illustrator software, and the open source Potrace tool found on the sourceforge dot net web site, are found to create splines that try to bridge discontinuous graphic elements that bridge boundaries—greatly reducing the visibility of such edges.

Figure 25:
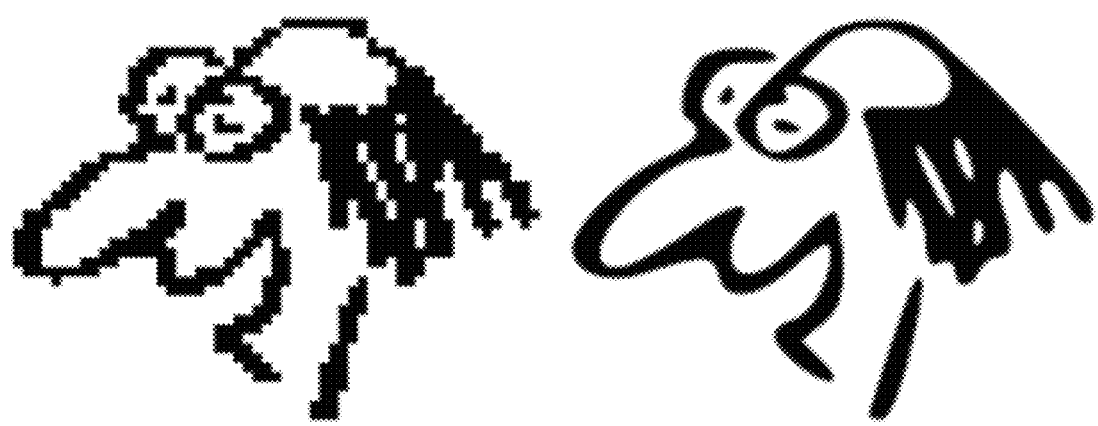
FIG. 25 shows that a raster image and a vector counterpart, produced by a prior art vectorization tool.

An example showing operation of such tools is shown in FIG. 25. A raster image (e.g., comprised of pixels) is shown on the left. A corresponding vector image produced by the Potrace tool is shown on the right. This vectorization mitigation of edge discontinuities in mosaics is an untended use that applicant discovered by accident.

Thus, a further aspect of the present technology involves generating a counterpart raster image block corresponding to a 2D code signal image block, by assembling an array of edge-adjoining excerpts selected from one or more other raster images, and then vectorizing the counterpart raster image block. (If desired, the vectorized result can then be rasterized to reconvert to the pixel domain; the reduced border visibility persists through such rasterizing operation.)

The present technology can be used to mimic 2D image blocks of any form. Typically we are interested in mimicking 2D digital watermark signal blocks.

The term "watermark" commonly denotes an indicia that escapes human attention, i.e., is steganographic. While steganographic watermarks can be advantageous, they are not essential. Watermarks forming overt, human-conspicuous patterns, can be employed in embodiments of the present technology.

For purposes of this patent application, a watermark is a 2D code produced through an encoding process that represents a message of N symbols using K output symbols, where the ratio N/K is less than 0.2. (In convolutional coding terms, this is the base rate, where smaller rates indicate greater redundancy and thus greater robustness in conveying information through noisy "channels"). In preferred embodiments the ratio N/K is 0.1 or less. Due to the small base rate, a payload can be decoded from a watermark even if half of more (commonly three-quarters or more) or the code is missing.

In an illustrative embodiment, 47 payload bits are concatenated with 24 CRC bits, and these 71 bits ("N") are convolutionally encoded at a base rate of 1/13 to yield 924 bits ("K"). A further 100 bits of version data are appended to indicate version information, yielding 1024 bits. These bits are then scrambled and spread to yield the 16,384 values in a 128×128 continuous tone watermark.

Some other 2D codes make use of error correction, but not to such a degree. A QR code, for example, encoded with the highest possible error correction level, can recover from only 30% loss of the code.

Preferred watermark embodiments are also characterized by a synchronization (reference) signal component that is expressed where message data is also expressed. For example, every mark in a sparse watermark is typically a function of the synchronization signal. Again in contrast, synchronization in QR codes is achieved by alignment patterns placed at three corners and at certain intermediate cells. Message data is expressed at none of these locations.

Earlier-cited patent document 20190332840 provides additional information on watermarks—both continuous-tone and sparse.

The processes and arrangements disclosed in this specification can be implemented as instructions for computing devices, including general purpose processor instructions for a variety of programmable processors, such as microprocessors and systems on a chip (e.g., the Intel Atom, the ARM A8 and Cortex series, the Qualcomm Snapdragon, and the nVidia Tegra 4. Implementation can also employ a variety of specialized processors, such as graphics processing units (GPUs, such as are included in the nVidia Tegra series, and the Adreno 530-part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC). Additional details concerning special purpose electronic circuitry are provided in our U.S. Pat. No. 9,819,950.

Software instructions for implementing the detailed functionality can be authored by artisans without undue experimentation from the descriptions provided herein, e.g., written in C, C++, Visual Basic, Java, Python, Tcl, Perl, Scheme, Ruby, Matlab, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

Further details concerning watermarking that can be used in embodiments of the present technology are detailed in certain of the references earlier-identified, and are also disclosed in applicant's U.S. Pat. Nos. 6,122,403, 6,590,996, 6,614,914, 6,975,744, 9,747,656, 9,959,587, 10,242,434, 20170024840, 20190266749, 20190306385, and 20160364623.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular orderings of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the technology.

The invention claimed is:

1. A method of transforming a 2D image signal block into an alternate, mimicked, representation, comprising:
   receiving, at a computer system, data defining the 2D image signal block and data defining a first image graphic, the 2D image signal block spanning an area that is more than 18 times as large as a square area spanned by the first image graphic, and with said computer system:
   (a) performing a spatial correlation operation to determine a first image graphic placement location within the 2D image signal block at which correlation between the first image graphic and the 2D image signal block is maximized;
   (b) disqualifying from future consideration an area of said 2D image signal block associated with said first image graphic placement location, said disqualifying yielding a disqualified area;
   (c) performing a spatial correlation operation to determine a second image graphic placement location within the 2D image signal block but outside the disqualified area, at which correlation between a second image graphic and the 2D image signal block is maximized; and
   (d) composing a counterpart 2D image signal block that graphically mimics the 2D image signal block by placing the first image graphic at said first image graphic placement location within the counterpart 2D image signal block and placing the second image graphic at the second image graphic placement location within the counterpart 2D image signal block;
   wherein said method transforms the 2D image signal block into an alternate, mimicked, representation incorporating the first image graphic and the second image graphic.

2. The method of claim 1 in which the first image graphic and the second image graphic are identical.

3. The method of claim 1 in which the second image graphic is different than the first image graphic.

4. The method of claim 1 in which the second image graphic comprises the first image graphic, but at a different scale.

5. The method of claim 1 in which the second image graphic is the first image graphic, but at a different rotation.

6. The method of claim 1 in which the first image graphic and the second image graphic are bitonal graphics.

7. The method of claim 1 in which the first image graphic is a greyscale graphic, rather than a bitonal or color graphic.

8. The method of claim 1 in which the first image graphic is a color graphic, rather than a bitonal or greyscale graphic.

9. The method of claim 1 in which the input 2D image signal block is a machine-readable code that conveys a plural-symbol payload.

10. A physical item marked with a machine-readable code comprising plural image graphics of different sizes, shapes, and/or orientations, produced by the method of claim 9.

11. The method of claim 1 that further includes repeating acts (b)-(d) for one or more cycles using additional image graphics, each cycle:
    modifying the disqualified area to include a further area associated with a previously-chosen image graphic placement location within the 2D image signal block, said modifying yielding a modified disqualified area;
    choosing a further image graphic placement location, within the 2D image signal block but outside the modified disqualified area, at which correlation between a further image graphic and the 2D image signal block is maximized; and
    placing said further image graphic at said further image graphic placement location within the counterpart 2D image signal block.

12. The method of claim 1 that further includes:
    dividing the 2D image signal block into plural original regions; and
    for each of said plural original regions of the 2D image signal block, composing a counterpart region of the counterpart 2D image signal block by placing image graphics therein;

wherein an image graphic placed in a first counterpart region is not also placed in a second counterpart region.

13. The method of claim 12 in which the first counterpart region is composed of image graphics drawn from a first collection of one or more image graphics, and the second counterpart region is composed of image graphics drawn from a second collection of one or more image graphics, and the first collection of one or more image graphics and the second collection of one or more image graphics are different.

14. Apparatus for transforming a 2D image signal block into an alternate, mimicked, representation, comprising:
a computer system including a processor and a memory, the memory storing data defining the 2D image signal block and data defining a first image graphic, the 2D image signal block spanning an area that is more than 18 times as large as a square area spanned by the first image graphic:
means for performing a spatial correlation operation to determine a first image graphic placement location within the 2D image signal block at which correlation between the first image graphic and the 2D image signal block is maximized;
means for disqualifying from future consideration an area of said 2D image signal block associated with said first image graphic placement location, upon operation, said means for disqualifying yielding a disqualified area;
means for performing a spatial correlation operation to determine a second image graphic placement location within the 2D image signal block but outside the disqualified area, at which correlation between a second image graphic and the 2D image signal block is maximized; and
means for composing a counterpart 2D image signal block that graphically mimics the 2D image signal block by placing the first image graphic at said first image graphic placement location within the counterpart 2D image signal block and placing the second image graphic at the second image graphic placement location within the counterpart 2D image signal block;
wherein said apparatus serves to transform the 2D image signal block into an alternate, mimicked, representation incorporating the first image graphic and the second image graphic.

15. The apparatus of claim 14 in which the 2D image signal block is a machine-readable code that conveys a plural-symbol payload.

16. The apparatus of claim 14 further comprising:
means for modifying a disqualified area to include a further area associated with a previously-chosen image graphic placement location within the 2D image signal block, upon operation, said means for modifying yielding a modified disqualified area;
means for choosing a further image graphic placement location, within the 2D image signal block but outside the modified disqualified area, at which correlation between a further image graphic and the 2D image signal block is maximized; and
means for placing said further image graphic at said further image graphic placement location within the counterpart 2D image signal block.

17. The apparatus of claim 14 further comprising:
means for dividing the 2D image signal block into plural original regions; and
means for composing a counterpart region of the counterpart 2D image signal block by placing image graphics therein, for each of said plural original regions of the 2D image signal block,
wherein an image graphic placed in a first counterpart region is not also placed in a second counterpart region.

18. The apparatus of claim 17 in which the first counterpart region is composed of image graphics drawn from a first collection of one or more image graphics, and the second counterpart region is composed of image graphics drawn from a second collection of one or more image graphics, and the first collection of one or more image graphics and the second collection of one or more image graphics are different.

19. A non-transitory computer-readable medium storing instructions that, when executed by one or more processors of a computer system, cause the computer system to transform a 2D image signal block into an alternate, mimicked, representation, by performing operations comprising:
receiving data defining the 2D image signal block and data defining a first image graphic, the 2D image signal block spanning an area that is more than 18 times as large as a square area spanned by the first image graphic:
performing a spatial correlation operation to determine a first image graphic placement location within the 2D image signal block at which correlation between the first image graphic and the 2D image signal block is maximized;
disqualifying from future consideration an area of said 2D image signal block associated with said first image graphic placement location, upon operation, the disqualifying yielding a disqualified area;
performing a spatial correlation operation to determine a second image graphic placement location within the 2D image signal block but outside the disqualified area, at which correlation between a second image graphic and the 2D image signal block is maximized; and
composing a counterpart 2D image signal block that graphically mimics the 2D image signal block by placing the first image graphic at said first image graphic placement location within the counterpart 2D image signal block and placing the second image graphic at the second image graphic placement location within the counterpart 2D image signal block;
wherein said operations serve to transform the 2D image signal block into an alternate, mimicked, representation incorporating the first image graphic and the second image graphic.

20. The non-transitory computer-readable medium of claim 19 that further comprises instructions that, when executed by one or more processors of the computer system, cause the computer system to repeat operations (b)-(d) for one or more cycles using additional image graphics, each cycle:
modifying the disqualified area to include a further area associated with a previously-chosen image graphic placement location within the 2D image signal block, the modifying, upon operation, yielding a modified disqualified area;
choosing a further image graphic placement location, within the 2D image signal block but outside the modified disqualified area, at which correlation between a further image graphic and the 2D image signal block is maximized; and
placing said further image graphic at said further image graphic placement location within the counterpart 2D image signal block.

21. The non-transitory computer-readable medium of claim 19, further storing instructions that, when executed by one or more processors of the computer system, cause the computer system to perform operations comprising:
- dividing the 2D image signal block into plural original regions; and
- for each of said plural original regions of the 2D image signal block, composing a counterpart region of the counterpart 2D image signal block by placing image graphics therein;
- wherein an image graphic placed in a first counterpart region is not also placed in a second counterpart region.

22. The non-transitory computer-readable medium of claim 21, in which execution of said instructions result in the first counterpart region being composed of image graphics drawn from a first collection of one or more image graphics, and the second counterpart region being composed of image graphics drawn from a second collection of one or more image graphics, and the first collection of one or more image graphics and the second collection of one or more image graphics are different.

23. The method of claim 1 in which the 2D image signal block spans an area that is less than 3200 times as large as the square area spanned by the first image graphic.

24. The method of claim 1 in which the 2D image signal block spans an area that is more than 900 times as large as the square area spanned by the first image graphic.

* * * * *